(12) United States Patent
Kim et al.

(10) Patent No.: US 6,546,412 B1
(45) Date of Patent: Apr. 8, 2003

(54) STATE-BASED OBJECT TRANSITION CONTROL AND NESTED LOCKING

(75) Inventors: Sang W. Kim, Lawndale, CA (US); David P. Nesbitt, Redondo Beach, CA (US); Steve A. Okamoto, Torrance, CA (US); Jennifer D. Thomas, Hermosa Beach, CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 08/966,381

(22) Filed: Nov. 7, 1997

(51) Int. Cl.$^7$ .................................................. G06F 9/00
(52) U.S. Cl. ...................................... 709/104; 709/107
(58) Field of Search .............................. 707/8; 710/200; 709/104, 102, 315, 107, 106

(56) References Cited

U.S. PATENT DOCUMENTS

| | | | | |
|---|---|---|---|---|
| 5,161,227 A | * | 11/1992 | Dias et al. .................... | 395/650 |
| 5,317,737 A | * | 5/1994 | Barton ......................... | 395/650 |
| 5,414,839 A | * | 5/1995 | Joshi ............................ | 395/600 |
| 5,454,108 A | * | 9/1995 | Devarakonda et al. ....... | 395/650 |
| 5,488,721 A | * | 1/1996 | Rich et al. .................... | 395/600 |
| 5,701,470 A | * | 12/1997 | Joy et al. ...................... | 395/614 |
| 5,862,376 A | * | 1/1999 | Steete, Jr. et al. ........... | 395/677 |
| 5,931,919 A | * | 8/1999 | Thomas et al. .............. | 709/303 |

FOREIGN PATENT DOCUMENTS

EP           0917051 A2   *   5/1999

OTHER PUBLICATIONS

J. Garza, et al, "Transaction Management in an object–Oriented Database System", ACM, pp. 37–45, 1988.*

S. Lee, et al, "A Multi–Granularity Locking Model for Concurrency Control in Object–Oriented Database Systems", IEEE, pp. 144–156, Feb. 1996.*

Dong C. Shin et al., "A Deadlock Detection Algorithm for Nested Transaction Model", 8205 Microprocessing and Microprogramming Euromicro '89, Ed.: S. Winter 28(1990)Mar., Nos. 1/5, Amsterdam, NL.

Anand Tripathi et al., "Synchronization of Nested Atomic Actions", 8239 Software Practice & Experience 20(1990)Aug., No. 8, Chichester, Suss.

A. Tripathi et al.; "Synchronization of Nested Atomic Actions"; Software Practice & Experience, Aug. 1990; vol. 20, No. 8, pp. 773–798.

Dong C. Shin et al.; "A Deadlock Detection Algorithm for Nested Transaction Model"; Microprocessing and Microprocramming; Mar. 1990; vol. 28, No. 1/05, pp. 9–14.

Threads Primer, A Guide to Multithreaded Programming, pps. 140–143, Lewis & Berg, Sunsoft Press.

* cited by examiner

*Primary Examiner*—Sue Lao
(74) *Attorney, Agent, or Firm*—Oliff & Berridge, PLC

(57) ABSTRACT

Temporary states are used transitionally in run-time situations and are unknown to the object database. A temporary state is created if, when an object is performing a requested event, interim work needs to be performed before the object reaches a permanent destination state. Use of a temporary state is transparent to the caller of the requested event. Within a single flow of control, an unlimited number of nested locks may be acquired. A request to unlock an object will only truly unlock the object if the unlock requester is at the highest level of locking. For recursive or embedded functions, no knowledge of the previous locking condition is necessary. Attribute-based locking provides a mechanism for allowing only certain members of the system to lock an object for writing while the object is in a predetermined state. However, any thread may obtain a read lock on an object in order to examine its attributes. This may be expanded to state that the system may restrict locking of an object or entity based upon any attribute in the database or upon any combination or logical expression of these attributes.

22 Claims, 5 Drawing Sheets

STATE-BASED OBJECT TRANSITION CONTROL AND NESTED LOCKING

BACKGROUND OF THE INVENTION

1. Field of Invention

This invention relates generally to object transition control and locking. More particularly, this invention is directed to the use of temporary states for objects, nested locking of objects along a single thread or control flow, and attribute-based locking of an object.

2. Description of Related Art

State-model algorithms are used where each program object, or object, manages itself A process from anywhere in the system may send an event to an object, requesting that the object perform a certain action upon itself Depending upon the action requested in relation to the current state of the object, the object transitions itself to a predetermined state in which it performs a series of commands. Many externally-generated requests transmitted to objects may cause the objects to initiate subsequent actions upon themselves and/or upon other secondary objects. State-model algorithms generally stipulate that the commands performed by a given state must be predetermined and must not rely upon knowledge of the previous state of the object or of the action requested which led the object to its current state.

Objects in a system may be subject to read or write locks, which restrict access to the object in order to preserve the integrity of the data or attributes associated with that object. Locking, or more generally the process of barring use of a file, database object, or any other embodiment of object information, is used in situations when more than one object or user might try to access the same file, database record, or other object data at the same time. In a multi-threaded environment, many users can read from or write to commonly accessed information storage areas. If a read lock is applied to a given storage area, other objects may continue to read from that storage area. However, if a write lock is applied to the storage area, then no other entity is allowed to read form or write to the locked storage area, Thereby preventing another process from interfering with the object's data while the data is being updated.

When a standard, state-based, object-oriented model is created, temporary object states, nested locking, and attribute-based locking may not be available.

SUMMARY OF THE INVENTION

This invention provides new mechanisms for locking any shared entity within the same thread or process flow, thereby creating a system that allows a hierarchy of locking of shared entities along a single thread or flow of control.

This invention also provides new forms of temporary states that combine event-based modeling with state-based modeling.

This invention further provides for attribute-based locking which, in the context of an object state model, allows for selective locking of objects while they are in predetermined states.

In an event-based model, actions to be performed upon an object are determined by the event requested of the object. In a state-based model, the actions to be performed are determined by the state to which the object is sent due to a requested event. In a state-based model, there may be more that one event which could lead the object from the same starting state to the same destination state. Also, a single event may send the object from one of any number of starting states to a single destination state.

Where there exists a single starting state and a single destination state, there may be certain interim work which needs to be performed, depending upon the action requested. This work cannot be associated with the final destination state because it is not relevant for all occasions when the object might be in that state. This invention, which is based upon the state-based model, provides temporary states to perform this interim work before sending the object to its final destination state. This temporary state is used only during runtime and is unknown to the object database. Furthermore, this temporary state itself initiates an action on the object to send the object to the correct final state upon completion of the required interim work.

When an object may be coming from any number of different states to a single destination state, there exists a situation where, depending upon from which state the object is coming, unique interim work may need to be performed. In this situation also, it is useful to use temporary states to perform the interim work before sending the object to its final state.

By using temporary states in the above situations, violation is avoided of the traditional state-based model guidelines which provide that a given state need not know the previous state of an object or the action requested of it. All temporary and permanent states have pre-defined actions which do not rely upon any knowledge of the previous state of the object. The reaching and leaving of these states is entirely determined by the pre-defined object-state model.

In some state transition models, it may be desirable to lock an object as it arrives in each state, perform the work required for that state, then unlock the object. Using this implementation, there might be a problem with making recursive calls when transitioning between temporary and permanent states. The concept of nested locking provides for the recursive locking of objects. Therefore nested locking may be quite useful when using temporary states which recursively generate events to transition an object through multiple states within a single request.

In a multi-threaded system, when a thread or process intends to perform some action upon a given object, it generally acquires a lock on the object, then begins its operation. In the course of this operation, it may occur that a function is called which would also like to perform some work upon this object. In this situation, in a traditional system, the called function might require some knowledge as to whether or not there has already been a lock acquired for this object. If a lock has already been acquired for it, it should avoid trying to lock the object. Conversely, the called function MUST lock the object at this point if a lock has not already been acquired.

Using the invention of nested locking, a called, or nested, function will never require this knowledge. In all cases, if a nested function needs to perform work upon an object, it will request a lock for that object. If it so happens that the caller of the function has at some point already acquired the lock, the function's request for the lock will still return normally, implying that a lock has indeed been acquired. In actuality, the lock was already in place; however, the nested function only really needs to know that a lock for this object is presently in place. The lock requested by the nested function is called a nested lock. When the nested function completes its operation, it issues a release of the lock, or unlock request, for the given object. However, because the nested function did not obtain the original lock on the object, the unlock request will not actually release the lock on the object. The request for the release of the lock WILL return normally, indicating that the unlock request succeeded, but the original acquirer of the lock will still retain a lock on the object.

Thus, within a single thread or flow of control, an unlimited number of nested locks may be acquired. A request to unlock an object will only truly unlock the object if the caller is at the highest level of locking. With this invention, for recursive or embedded functions, no knowledge with regard to the previous locking condition is necessary. This concept may be useful for object state models, where state transitions are often recursively called. This may be especially useful when temporary states are used which generate new events to transition the object to a new state.

In a multi-threaded system, a condition may occur in which locks have been obtained for two or more objects in the system, and in which subsequent operation requires the obtaining of a lock for one of the objects that is already locked. The currently locked objects will not be unlocked until operation has completed, yet the operation cannot complete until one or more of the objects is unlocked. This is called a deadlock.

Without nested locking, a deadlock could potentially occur within a single thread; it would occur anytime a nested function attempted to lock an object which was already locked by that thread. In the context of the state transition model, an example of a potential deadlock situation begins with an external request being sent to an object. That object locks itself and performs some actions, one of which includes an action upon a second object. At that point the second object may obtain a lock upon itself, perform some action, then need to perform work upon the first object. It will attempt to lock the first object, but will wait forever for a lock. With the nested locking of this invention, this scenario cannot happen. Within a single thread, any number of locks for any number of objects, by any number of objects, is permitted. The object or nested function which obtained the original lock will be the object or nested function to actually release the lock, and this will be transparent to all lock and unlock requesters.

In nested locking, if the true-lock obtained was a write lock, any number of nested read or write locks may be obtained. However, if the true-lock obtained was a read lock, only nested read locks may be obtained. If a write lock is requested when the true-lock was a read lock, the locking mechanism will reject the request, without resulting in a deadlock.

Within the object state model several specialized types of locking may need to be used in conjunction with one another. Attribute-based locking is another type of specialized locking that can be used within an object state model.

When an object is performing a time consuming task, it may not want to be "disturbed" by any threads, that is, the object does not want its state to be changed or have any of its attributes modified. Normally, to accomplish this, the object would retain a write-lock on itself. However, during a time consuming task, the object may not want to retain a write-lock upon itself, because it would like for other threads to be able to read from it, should they need to do so. Furthermore, the object may want to spawn a different thread to complete a portion of the long task, and to allow that spawned thread to eventually write-lock the object and change the object state when the work is completed.

With the attribute-based locking of this invention, when an object is in certain pre-defined states (meaning its "state" attribute in the database has one of several specified values), the object may be unlocked and made available for reading. However, the attribute-based locking mechanism will only allow threads with specific permission to write-lock the object while it is in that state. Other threads who request a write lock on the object will be forced to wait until the object is no longer in the predefined state before they will receive a lock.

This concept may be expanded beyond the state attribute, to say that the locking mechanism may selectively allow certain threads to lock based on the value of any attribute or any combination or logical expression of attributes in the database.

Other aspects of the invention will become apparent from the following more detailed description, taken in conjunction with the accompanying drawings.

BRIEF DESCRIPTION OF THE DRAWINGS

The preferred embodiments of this invention will be described in detail, with reference to the following figures wherein.

DETAILED DESCRIPTION OF PREFERRED EMBODIMENTS

Figure 1:
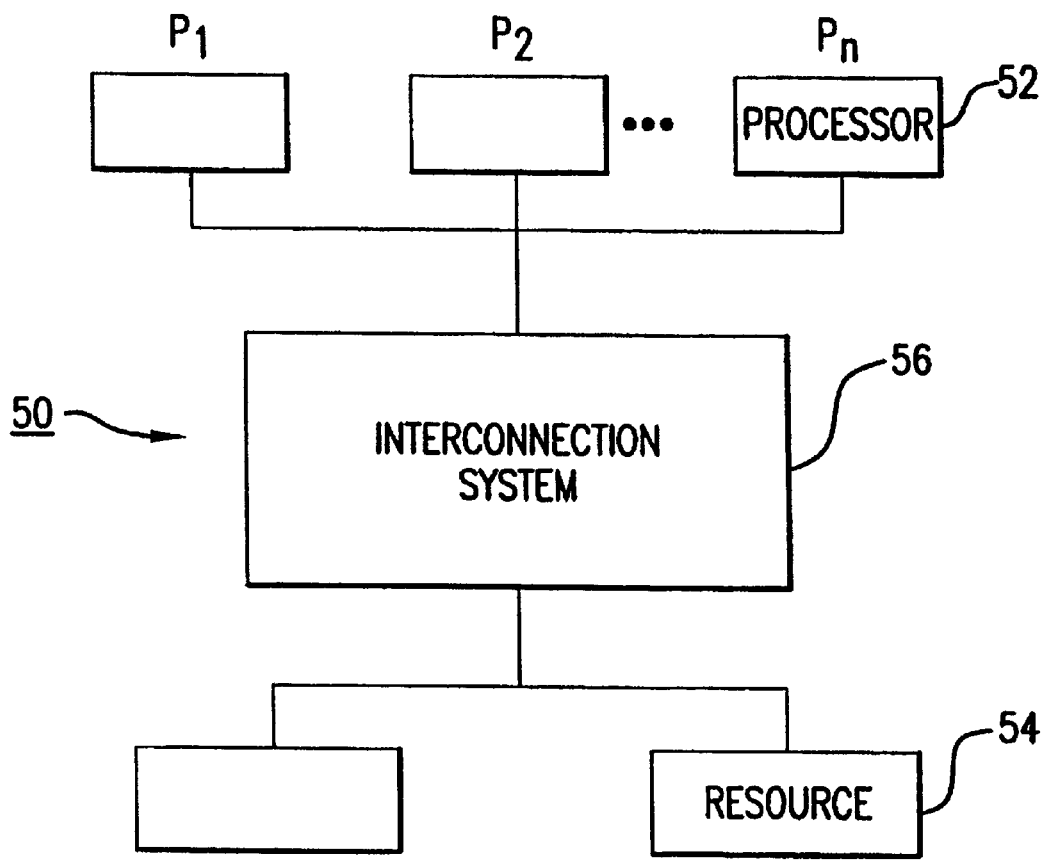
FIG. 1 is a block diagram of a distributive processor system embodying the features of this invention.

FIG. 1 shows a distributed multiprocessing system 50 that includes a number of processors 52 and resources 54 connected through an interconnection system 16. The multiprocessing system 50 can also be a real-time system, a wide-area network, a local-area network, or a network with a primary processor and a plurality of secondary processors, wherein the secondary processors run in a peer-to-peer network among themselves without being monitored by the primary processor. Finally, the multiprocessing system 50 can be a single computer where each processor is a separate processing object and the separate processing objects require connecting threads. The processors 52 can also be individual objects in a distributed computing environment.

Figure 2:
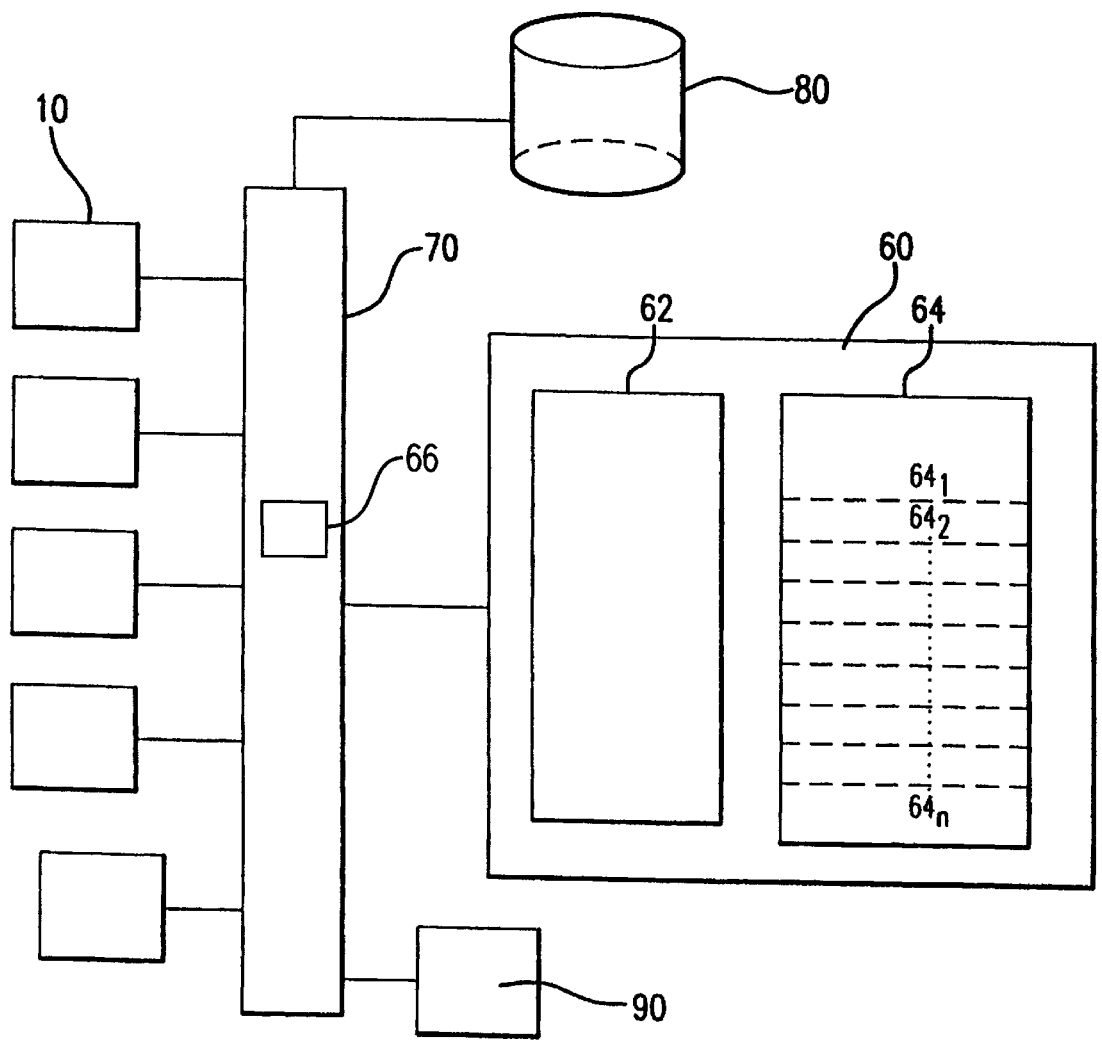
FIG. 2 is a block diagram of an interconnection system of the distributed processor system shown in FIG. 1.

FIG. 2 is a block diagram of the interconnection system 56 of FIG. 1. As shown in FIG. 2, the interconnection system 56 includes a memory 60 that communicates with objects 10 via an interface 70. The interface 70 includes, for example, a locking mechanism 66. A storage unit 80 and an input/output (I/O) device 90 are also connected to the interface 70. The memory unit 60 includes a storage area 62 for storing executable programs, and a data storage areas 64 for storing data.

During operation of the multiprocessing system 50, to execute several processes P1–Pn, each process Pi will be associated with an object 10. The executable code for these processes is stored in the storage area 62. The data storage area 64 contains the data on which the processes will operate. The storage area 64 may be logically divided into separate storage areas $64_1$–$64_n$ for the storage of data structures. During execution of the processes $P_1$–$P_n$, it may be desirable to synchronize access to various system resources, such as the data storage area 64, the data storage device 80, and the I/O device 90, for example. In this manner only one object 10, or a limited number of objects 10 connected along a single flow of control (not shown), will have access to these resources at any one time.

Figure 3:
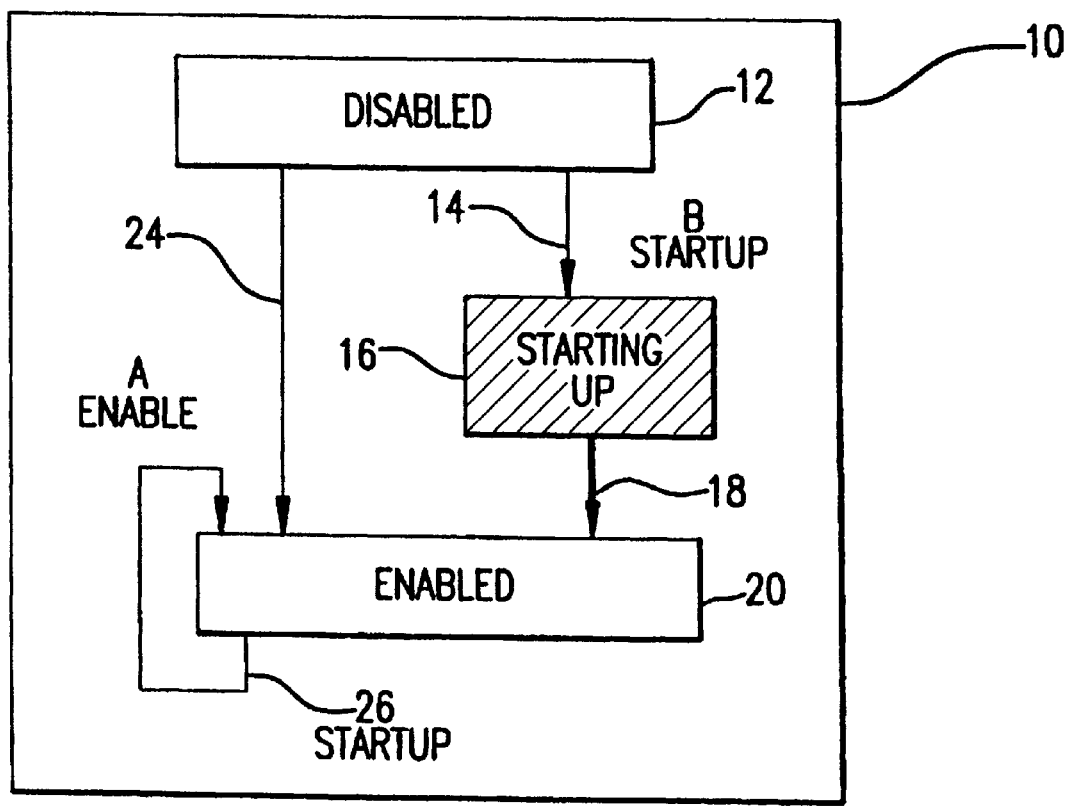
FIG. 3 is a diagram of the temporary transitional states according to this invention.

FIG. 3 shows the temporary state of an object 10 of this invention. As shown in FIG. 3, an object 10 is in a disabled state 12 when a start-up request 14 to enable the object 10 is initiated. The object 10 goes from the disabled state 12 to temporary state 16 in response to the start-up request 14. While the object 10 is in the temporary state 16, some interim activities will occur. When the interim activities are complete, an event 18 is generated by the temporary or transitional state 16 to complete the enabling of the object 10, placing the object 10 in enabled state 20. When the initiated event is not a start-up request, but instead is an enable request 24, the object proceeds directly from the disabled state 12 to the enabled state 20.

Temporary states may or may not be necessary depending on the event requested in conjunction with the present state of the object. If the object is in enabled state 20 when a start-up request is received, it does not need to perform the work performed in in temporary state 16, because it has already been done. Therefore, from enabled state 20, the start-up request 26 causes the object to remain in state 20.

The object 10 is not concerned with how it arrives at a new state. In FIG. 3, the object 10 is not concerned with how it got from the disabled state 12 to the enabled state 20. Actions performed in enabled state 20 are not based upon whether the object was previously in permanent state 12 or temporary state 16. The temporary state 16 allows interim activities to occur and it is transparent to the object generating the start-up request 14 that the object passed through temporary state 16 before it reached the permanent state 20.

Generally, read and write locks may be applied to an object 10 in order to control access by other objects to the object 10 during reading or writing. When an object is locked while work is being performed, subsequent operations may be requested which require a lock upon the same object. With nested locking, the subsequent operation does not need to know whether or not the requester has already obtained a lock on the given object. For example, a first object may lock itself, then spawn a request directed at a second object. As a result, the second object may need to perform an action on the first object which requires a lock on the first object. The second object may obtain the lock for the first object without knowing that the first object has been previously locked.

Figure 4:
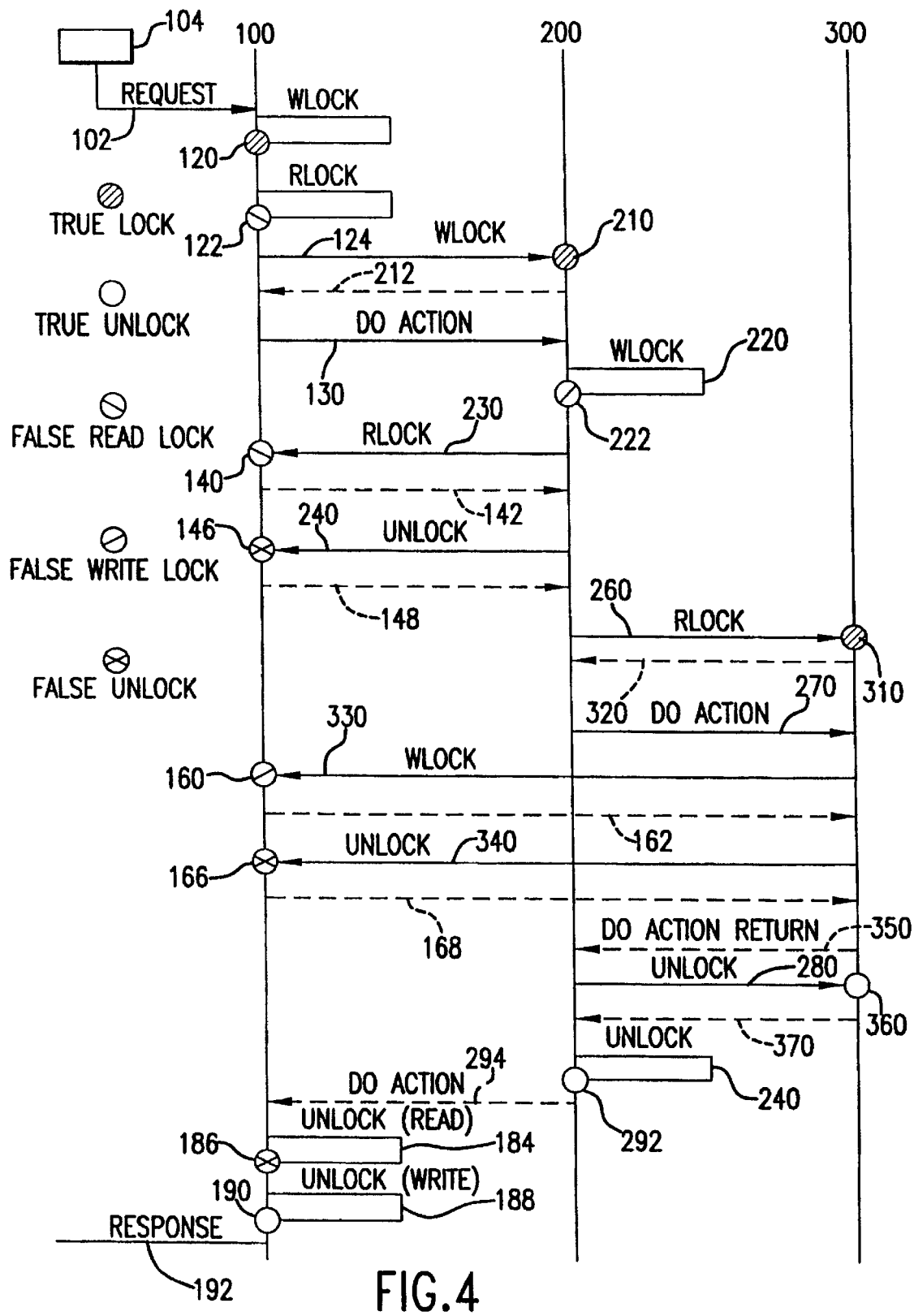
FIG. 4 is a diagram showing nested locking of objects according to this invention.

FIG. 4 shows one example of the nested locking of this invention among a job object 100, a document object 200, and a printer object 300. A request event 102 is generated externally by an initiating thread 104, which submits the request event 102 to the job object 100. The job object 100 receives the request event 102 and requests a lock from the nested locking mechanism 66. The nested locking mechanism controls whether a true lock or a false lock will be placed. The nested locking mechanism places a true write lock 120 on the job object 100. While performing the requested even 102, the job object 100 may perform an operation which needs to place a read lock 122 on the job object 100. However, because the job object 100 is already subject to the write lock 120, the read lock 122 would normally be refused by the system. Instead, the job object 100, via the nested locking mechanism of this invention, places a false read lock 122 upon itself.

Next, the job object 100 may send a write lock request 124 to the document object 200. The locking mechanism, upon receiving the write lock request 124, places a true write lock 210 on the document object 200. The job object 100, upon receiving confirmation 212 that a write lock was placed on the document object 200, sends an action request 130 to perform an action within the document object 200.

The document object 200, upon receiving the action request 130, begins performing the requested operation on itself The requested operation may require that the document object 200 place a write lock on itself However, because the write lock 210 has already been placed on the document object 200, this write lock would normally be denied. Instead, based on the nested locking of this invention, a false write lock is placed on the document object 200 and confirmation of a received write lock is returned to the document object 200.

The document object 200, while continuing the operation requested by the action request 130, issues a read lock request 230 to the job object 100. Upon receiving the read lock request 230, the locking mechanism, instead of allowing the job object 100 to become deadlocked, grants a false read lock 140. Upon completion of reading from the job object 100, the document object 200 issues an unlock request 240 in order to release the read lock 140 from the job object 100. The locking mechanism of this invention responds to the unlock request 240 by performing a false unlock 146 on the job object 100. It then returns to the document object 200 indicating that an unlock operation has been performed on the job object 100 to release the read lock 140. In reality, the job object 100 is not unlocked because the read lock 140 was a false read lock.

The document object 200, upon receiving a confirmation from its unlock request 240 of the job object 100, issues a read lock request 260 to the printer object 300. The printer object 300 receives the read lock request 260, places a true read lock 310 on itself, and informs the document object 200 that a read lock was placed on the printer object 300.

The document object 200 next issues an action request 270 to the printer object 300. The printer object 300 performs the operation requested by the action request 270. As a result, the printer object 300 sends a request 330 to write lock the job object 100. The locking mechanism receives the write lock request 330 and issues a false write lock 160. In actuality, no write lock was placed on the job object 100, as the job object 100 was already subject to the write lock 120. Because a write lock 120 is already in place, the job object 100 returns a confirmation of a write lock to the printer object 300. As the printer object 300 continues to perform the operation requested by the action request 270, it completes writing to the job object 100, so it sends an unlock request 340 to the job object 100. The job object 100 receives the unlock request 340. In response, the job object 100, using the locking mechanism, issues a false unlock 166 of write lock 160. In reality, no unlock operation was performed on the job.

The printer object 300, having completed the actions requested by document object 200, returns 350 from action request 270 to the document object 200. The document object 200 receives confirmation of completion of the action request 270 from the printer object 300. In response, the document object 200 sends an unlock request 280 to the printer object 300. The printer object 300 receives the unlock request 280. In response, the printer object 300, through the locking mechanism, issues a true unlock 360 of read lock 310 which was a true read lock, and returns successfully to the document object 200.

The document object 200 then continues its operation of the action request 130. In particular, the document object 200 issues an unlock request 290 to itself, resulting in a false unlock 292 of false write lock 222.

The document object 200 has now completed its performance of the operation initially requested by the action request 130. The document object 200 then sends a completion confirmation 294 to the job object 100. The job object 100 now continues its performance of the operation originally requested by the action request 102 which now includes sending a read unlock request 184 to the job object 100 to unlock the read lock 122. The read unlock request 184 results in a false unlock 186 of false read lock 122. Next, the job object 100 sends a write unlock request 188 to the job object 100 to unlock the true write lock 120. The write unlock request 188 results in a real unlock 190 of job object 100. Upon confirmation of its two unlock operations, the job object 100 finally returns from the event request 102 by sending a response 192 to the initiating thread 104.

In this manner, the process described in relation to FIG. 4 outlines the hierarchy of locking within the same thread. In summary, the first object 100 locks itself and performs actions on itself. When the first object 100 requests a second object 200 to perform a function which requires reading from the first object 100, the second object 200 requests a lock 140, and is told it has a lock. In reality, the lock 120 was already in place on the first object 100. The second object being ignorant of this, needs only be informed that a lock is now in place. The second object 200 performs its function as requested because the second object was informed that a proper lock is in place. Upon completion of its function, the second object 200 releases its "lock" on the first object. However, the first object remains locked since the first object locked itself initially.

Thus, within a single thread, a deadlock cannot occur. Furthermore, within a single thread, an unlimited number of nested locks may be acquired. Requests to unlock an object will only truly unlock the object if the unlock requester is at the highest level of locking. For recursive or embedded functions, no knowledge with regard to the previous locking condition is necessary. For actions initiated upon other objects, the secondary objects may lock the original object without encountering a deadlock condition.

Additionally, should another object 10 on a different process thread attempt to access job object 100, object 10 will be denied and forced to wait until job object 100 unlocks. That is, if the object 10 is outside the single thread of job object 100 while job object 100 is locked, object 10 must wait. This is also true if the object 10 attempts to access any other object locked within the single thread initiated by action request 102.

Figure 5:
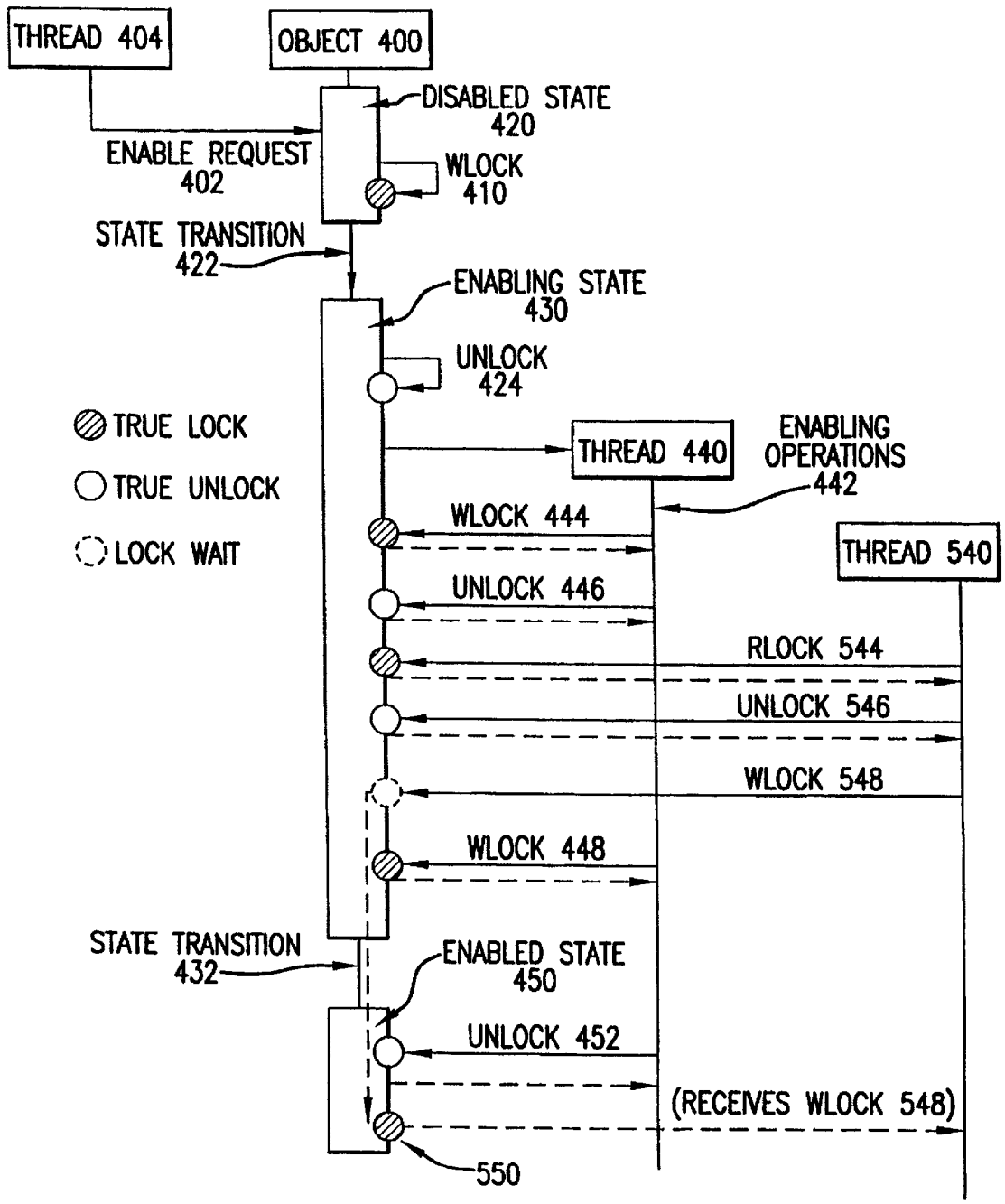
FIG. 5 is a diagram of attribute-based state locking of objects according to this invention.

FIG. 5 outlines the attribute-based locking of this invention. Attribute-based, or state-based, locking allows only certain members of the system to lock an object for writing when the object is in a predetermined state or has a predetermined logical combination of attributes. However, any thread may obtain a read lock on that object to examine its attributes. As shown in FIG. 5, an enable request 402 is sent by a thread 404 and received by an object 400. The object 400 applies a write lock 410 to itself. In particular, when the object receives the enable request 402, it is in a disabled state 420. In response to the enable request 402, the object 400 moves from the disabled state 420 along a transition 422 to a transitional enabling state 430. In the transitional state 430, some time-consuming interim activities need to occur. Thus, while in the enabling transitional state 430, object 400 unlocks itself 424, and spawns a thread 440 to perform some enabling operations 442.

With the object 400 in the enabling state 430, which has been predefined as a transitional state, only threads requesting special permission may be allowed to lock the object for writing. Other threads requesting a write lock for the object 400 will be forced to wait until the object 400 is no longer in the enabling state 430.

At this point the spawned thread 440 continues its work. While operating, thread 440 needs to write to the object 400, so it submits a write lock request 444 requesting special permission to write to the object 400 while in the enabling state 430. Thread 440 then unlocks 446 the object 400 when writing is completed.

Since the object 400 is still in the enabling state 430 at this point, other threads which are unrelated to the enable operation may not obtain a write lock for object 400. However, these unrelated threads may obtain read locks. For example, in FIG. 5, thread 540, which is not part of the enable operation, requests a read lock from the object 400, and successfully obtains read lock 544. When thread 540 has finished reading, it unlocks the object 400 via unlock request 446. Subsequently, however, thread 540 desires to lock the object 400 for writing, and sends write lock request 548.

At this point, it must wait for the object to leave the enabling state before its request for a write lock will return successfully.

When the spawned thread 440 has finally completed its operation, it must move the object out of the transitional enabling state. In order to do this, thread 440 issues a write lock request 448, again requesting special permission to write-lock the object 400 while it is in the enabling state 430. Thread 440 then transitions the object along a transition 432 to the enabled state 450 and issues unlock request 452 before exiting. Now that the object 400 is no longer locked and no longer in the enabling state, other waiting threads may now acquire a write lock. In FIG. 5, thread 540 obtains write lock 550 and receives confirmation from write lock request 548.

Attribute-based locking need not be limited to the state attribute of an object. The locking mechanism may examine any object attribute, or any combination or logical expression of these attributes. In summary, attribute-based or state-based locking occurs when it is desirable to unlock an object for reading, while continuing to prevent any actions from being performed upon the object until the request in process is complete. Attribute-based locking allows only certain members of the system to write lock an object while the object is in a predetermined state or has any combination of predetermined characteristics. However, any thread may obtain a read lock on the object to examine the objects attributes.

As shown in FIGS. 1–5, temporary states, nested locking and attribute-based locking are applied to objects implemented on a programmed general purpose computer system. However, temporary states, nested locking and attribute-based locking can also be applied to objects implemented on a special purpose computer, programmed microprocessor or micro-controller and peripheral integrated circuit elements, and ASIC or other integrated circuit, a hard wired electronic or a logic circuit such as a discreet element circuit, a programmable logic device such as a PLD, PLA, FPGA or PAL, or the like.

As will be understood by those familiar in the art, the present invention may be embodied in other specific forms without departing from the spirit or central characteristics thereof Although certain preferred embodiments have been shown and described, it should be understood that many changes and modifications may be made therein without departing from the scope of the appended claims.

Thus, while this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. A method for nested locking of a plurality of lockable objects on a flow of control, the method comprising:
   receiving at a locking mechanism a request to lock the first object and true-locking of the first object by the locking mechanism;
   issuing a request from the first object to a second object to perform an action;
   receiving at the locking mechanism a request from the second object to lock the second object and true-locking the second object; issuing a request from the second object to lock the first object;
   receiving at the locking mechanism a request for a lock on the first object by the second object;
   issuing a false-lock on the first object by the locking mechanism in response to the second object lock request; and
   replying to the second object from the locking mechanism that the requested true lock is in place,
   wherein the method allows the acquiring of an unlimited number of nested locks and the true-lock on the first object determines a hierarchy of all subsequent locks on the first object within the flow of control.

2. The nested locking method of claim 1, wherein a deadlock cannot occur between objects on the flow of control.

3. The nested locking method of claim 1, wherein the true-lock is either a read lock or a write lock, and wherein:
   if the true lock is a write lock, then the false-lock is either a false-read-lock or a false-write-lock, and
   if the true lock is a read lock, then the false-lock is a false-read-lock and a write lock request is rejected.

4. The nested locking method of claim 1, further comprising:
   the second object receiving the locking mechanism reply;
   issuing a request from the second object to unlock the first object;
   receiving at the locking mechanism the request from the second object to unlock the first object;
   issuing a false-unlock on the first object by the locking mechanism in response to the second object unlock request, and replying to the second object that the requested unlock has occurred.

5. The nested locking method of claim 4, further comprising:
   requesting a lock on a third object by the second object;
   true-locking the third object in response to the second object request for the lock, and;
   replying to the second object that the requested lock is in place.

6. The nested locking method of claim 5, further comprising:
   receiving at the locking mechanism a request for a lock on the first object by the third object; and
   issuing a false-lock on the first object by the locking mechanism in response to the third object lock request; and
   replying from the locking mechanism to the third object that the requested lock is in place.

7. The nested locking method of claim 6, further comprising:
   receiving the locking mechanism reply by the third object;
   issuing a request from the third object to unlock the first object;
   receiving at the locking mechanism the request from the third object to unlock the first object;
   issuing a false-unlock on the first object by the locking mechanism in response to the third object unlock request; and
   replying to the third object from the locking mechanism that the requested true-unlock has occurred.

8. The nested locking method of claim 7, further comprising:
   issuing a request from the second object to unlock the third object;
   issuing a false-unlock on the third object by the locking mechanism; and
   replying from the locking mechanism to the second object that the requested unlock has occurred.

9. The nested locking method of claim 8, further comprising:
   issuing an unlock request from the second object to itself, the locking mechanism performing a false-unlock on the second object; and
   sending a message from the second object to the first object that the second action request is complete.

10. The nested locking method of claim 9, further comprising:
    issuing a request from the first object to unlock itself;
    receiving at the locking mechanism the request to unlock the first object by the first object, and
    issuing a true-unlock on the first object in response to the first object request.

11. The nested locking method of claim 1, wherein the lockable objects are database records or database files.

12. The nested locking method of claim 1, wherein the number of nested locks obtained and released within a single flow of control is greater than 1.

13. The nested locking method of claim 1, wherein a first flow of control can pass control of the nested locking to a second flow of control.

14. The nested locking method of claim 1, wherein the lockable objects are any globally accessed storage.

15. The nested locking method of claim 1, wherein the flow of control is a thread.

16. A processing device for use with a plurality of objects comprising:
    a locking mechanism;
    means for receiving at a locking mechanism a request to lock the first object and true-locking of the first object by the locking mechanism;
    means for issuing a request from the first object to a second object to perform an action;
    means for receiving at the locking mechanism a request from the second object to lock the second object and true-locking the second object;
    means for issuing a request from the second object to lock the first object;
    means for receiving at the locking mechanism a request for a lock on the first object by the second object;
    means for issuing a false-lock on the first object by the locking mechanism in response to the second object lock request;

means for replying to the second object from the locking mechanism that the requested true lock is in place; and wherein the locking mechanism controls locking hierarchy among the plurality of objects on a single flow of control, the locking mechanism preventing deadlocks along the flow of control, wherein the processing device allows the acquiring of an unlimited number of nested locks, and wherein the locking mechanism issues the false-lock to the second object when the first object has at some point already been locked by the locking mechanism and the second object only needs to know that the first object is locked.

17. The processing device of claim 16, wherein the locking mechanism issues a true lock to first or highest caller in the locking hierarchy and false locks to callers lower in the hierarchy.

18. A method for nested locking of a plurality of lockable objects on a flow of control, the method comprising:

receiving at a locking mechanism a request to lock the first object and true-locking of the first object by the locking mechanism;

issuing a request from the first object to a second object to perform an action;

receiving at the locking mechanism a request from the second object to lock the second object and true-locking the second object;

issuing a request from the second object to lock the first object;

receiving at the locking mechanism a request for a lock on the first object by the second object; and issuing a false-lock on the first object by the locking mechanism in response to the second object lock request, wherein the locking mechanism issues the false-lock when the first object has at some point already been locked by the locking mechanism and the second object only needs to know that the first object is locked.

19. The nested locking method of claim 18, further comprising replying to the second object from the locking mechanism that the requested lock is in place.

20. A processing device for use with a plurality of objects comprising:

a locking mechanism;

means for receiving at a locking mechanism a request to lock the first object and true-locking of the first object by the locking mechanism;

means for issuing a request from the first object to a second object to perform an action;

means for receiving at the locking mechanism a request from the second object to lock the second object and true-locking the second object;

means for issuing a request from the second object to lock the first object;

means for receiving at the locking mechanism a request for a lock on the first object by the second object;

means for issuing a false-lock on the first object by the locking mechanism in response to the second object lock request; and means for replying to the second object from the locking mechanism that the requested lock is in place; and wherein the locking mechanism controls locking hierarchy among the plurality of objects on a single flow of control, the locking mechanism preventing deadlocks along the flow of control and the locking mechanism issues the false-lock when the first object has at some point already been locked by the locking mechanism and the second object only needs to know that the first object is locked.

21. The processing device of claim 20, further comprising means for replying to the second object from the locking mechanism that the requested lock is in place.

22. The processing device of claim 20, wherein the locking mechanism controls locking hierarchy among the plurality of objects on a single flow of control, the locking mechanism preventing deadlocks along the flow of control.

* * * * *